United States Patent
Seo et al.

(10) Patent No.: US 10,995,249 B2
(45) Date of Patent: May 4, 2021

(54) TIRE WITH REDUCED CAVITY NOISE

(71) Applicant: HANKOOK TIRE CO., LTD., Seoul (KR)

(72) Inventors: Byeong Ho Seo, Daejeon (KR); Hak Joo Kim, Daejeon (KR)

(73) Assignee: HANKOOK TIRE CO., LTD.

( * ) Notice: Subject to any disclaimer, the term of this patent is extended or adjusted under 35 U.S.C. 154(b) by 553 days.

(21) Appl. No.: 15/814,261

(22) Filed: Nov. 15, 2017

(65) Prior Publication Data
US 2018/0134933 A1 May 17, 2018

(30) Foreign Application Priority Data
Nov. 15, 2016 (KR) ........................ 10-2016-0151942

(51) Int. Cl.
| | | |
|---|---|---|
| *C09J 183/06* | (2006.01) | |
| *B60C 1/00* | (2006.01) | |
| *C09J 7/20* | (2018.01) | |
| *B60C 19/00* | (2006.01) | |
| *C08J 9/36* | (2006.01) | |
| *C09J 11/06* | (2006.01) | |
| *C08K 5/3475* | (2006.01) | |

(52) U.S. Cl.
CPC ............. *C09J 183/06* (2013.01); *B60C 1/00* (2013.01); *B60C 1/0008* (2013.01); *B60C 19/002* (2013.01); *C08J 9/36* (2013.01); *C09J 7/20* (2018.01); *C09J 11/06* (2013.01); *C08J 2375/04* (2013.01); *C08K 5/3475* (2013.01); *C09J 2301/408* (2020.08); *C09J 2483/00* (2013.01)

(58) Field of Classification Search
CPC .................................................... B60C 19/002
See application file for complete search history.

(56) References Cited

U.S. PATENT DOCUMENTS

| | | | | |
|---|---|---|---|---|
| 6,124,387 A | * | 9/2000 | Wang | C08G 18/10 524/251 |
| 7,569,645 B2 | * | 8/2009 | Lin | C08G 18/10 525/453 |
| 7,789,990 B2 | * | 9/2010 | Zhu | C09J 5/00 156/108 |
| 8,450,514 B2 | * | 5/2013 | Schubert | C08G 64/34 556/445 |

(Continued)

FOREIGN PATENT DOCUMENTS

| | | |
|---|---|---|
| CN | 104789140 A | 7/2015 |
| EP | 2397314 A1 | 12/2011 |

(Continued)

OTHER PUBLICATIONS

BASF (Tinuvin B75, 2010) (Year: 2010).*

*Primary Examiner* — Liam J Heincer
(74) *Attorney, Agent, or Firm* — Renaissance IP Law Group LLP

(57) ABSTRACT

Disclosed is a tire with reduced cavity noise including an adhesive agent layer applied to an inside of an inner liner and a sound absorber layer attached to the adhesive agent layer, wherein the adhesive agent layer includes polyether containing alkoxysilane at both ends thereof and a benzotriazole-based UV absorber. The tire with reduced cavity noise is stable without causing separation of a sound absorber even upon heating and deformation during driving.

15 Claims, 1 Drawing Sheet

(56) References Cited

U.S. PATENT DOCUMENTS

| | | | | |
|---|---|---|---|---|
| 8,642,708 B2* | 2/2014 | Stanjek | ............. | C08L 75/04 525/453 |
| 2011/0021693 A1* | 1/2011 | Henning | ............. | C08G 77/46 524/588 |
| 2012/0107626 A1* | 5/2012 | Schindler | ............. | C08G 65/336 428/447 |
| 2012/0136085 A1* | 5/2012 | Choi | ............. | C08G 18/1875 521/172 |
| 2012/0251832 A1* | 10/2012 | Huang | ............. | C08G 18/48 428/447 |
| 2013/0032262 A1* | 2/2013 | Bormann | ............. | B60C 19/002 152/450 |
| 2013/0048180 A1 | 2/2013 | Song | | |
| 2013/0102738 A1* | 4/2013 | Stanjek | ............. | C08G 18/10 525/455 |
| 2013/0237616 A1* | 9/2013 | Ferenz | ............. | C08G 65/00 514/785 |
| 2014/0261976 A1 | 9/2014 | Imoto et al. | | |
| 2016/0053145 A1* | 2/2016 | Lobert | ............. | C08G 18/755 525/403 |
| 2016/0122606 A1* | 5/2016 | Kusuda | ............. | C08L 63/00 523/456 |
| 2016/0194443 A1* | 7/2016 | Shen | ............. | C08G 65/336 524/588 |
| 2017/0050474 A1* | 2/2017 | Laubry | ............. | C08J 5/128 |
| 2017/0305209 A1* | 10/2017 | Caracino | ............. | B60C 5/002 |
| 2018/0111427 A1* | 4/2018 | Seo | ............. | C08L 21/00 |
| 2018/0111428 A1* | 4/2018 | Seo | ............. | B60C 1/0008 |
| 2018/0134933 A1* | 5/2018 | Seo | ............. | C09J 7/20 |
| 2018/0272815 A1* | 9/2018 | Seo | ............. | B60C 5/14 |
| 2018/0282600 A1* | 10/2018 | Seo | ............. | C09J 171/02 |
| 2018/0298252 A1* | 10/2018 | Zhou | ............. | C08G 18/10 |
| 2018/0339475 A1* | 11/2018 | Laubry | ............. | B29D 30/0061 |

FOREIGN PATENT DOCUMENTS

| | | |
|---|---|---|
| JP | 2006316262 A | 11/2006 |
| JP | 2009126463 A | 6/2009 |
| JP | 2013032009 A | 2/2013 |
| JP | 2015166134 A | 9/2015 |
| KR | 20120059505 A | 6/2012 |
| KR | 20140027223 A | 3/2014 |
| WO | 2004031300 A1 | 4/2004 |
| WO | 2015165899 A1 | 11/2015 |

* cited by examiner

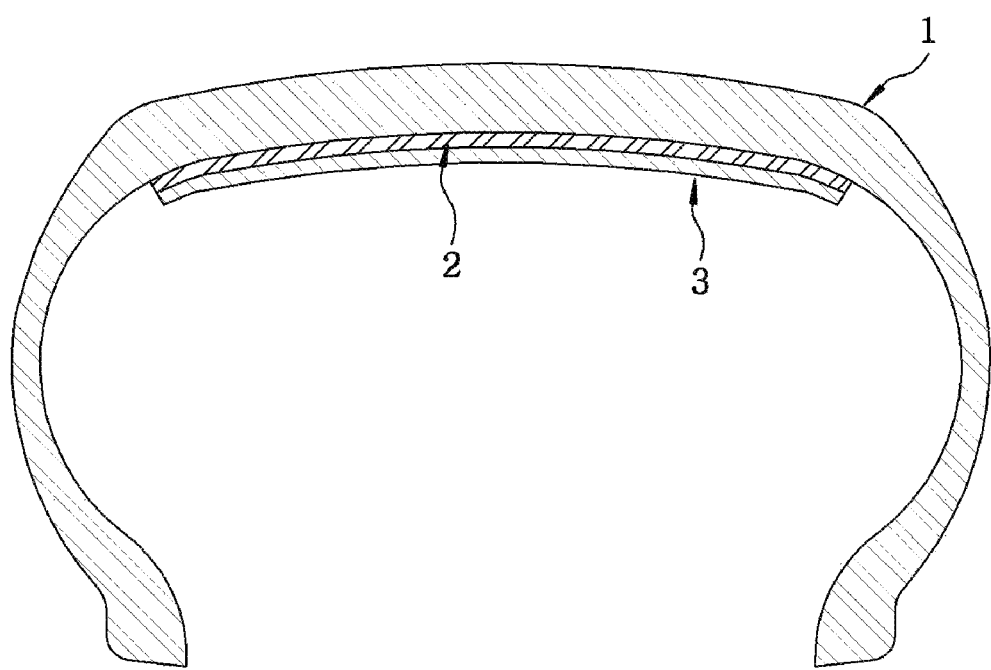

TIRE WITH REDUCED CAVITY NOISE

CROSS-REFERENCE TO RELATED APPLICATION

This patent application claims the benefit of priority under 35 U.S.C. 119 of Korean Patent Application No. 10-2016-0151942, filed on Nov. 15, 2016, the contents of which are hereby incorporated by reference for all purposes as if fully set forth herein.

BACKGROUND OF THE INVENTION

Field of the Invention

The present invention relates to a tire with reduced cavity noise which is stable while preventing separation of a sound absorber even upon heating and deformation during driving by including an adhesive agent composition with improved elasticity and adhesive strength.

Description of the Related Art

With strengthened government regulations on vehicle noise and increasing demand for electric vehicles, the need for reducing noise from tires is gradually increasing. However, in accordance with recent development trends, UHP (ultra high performance) tires having a configuration in which a tread contacting tire pavement is formed at a large width and a side wall corresponding to a side surface of the tire has a low aspect ratio are drawing a great deal of attention. In the case of such tires, since the strength of the side wall is increased due to structural properties thereof, the tires cannot normally perform their function of damping shock transferred from the pavement, thus causing an increase in sound pressure related to noise induction. This generates air vibration in a cavity of a tire, so that noise is transferred to the inside of the vehicle and is then detected by a driver, which eventually deteriorates ride comfort (hereinafter, noise due to air vibration will be broadly called "cavity sound").

Conventional technologies to reduce cavity sound include use of polyurethane foams having open cells. However, when a general liquid adhesive agent is used to adhere polyurethane foams to an inner liner inside a tire, the adhesive agent is absorbed in the sound absorber layer, thus disadvantageously leading to problems of significantly reducing sound absorbance and adhesive strength.

The adhesive agent cured by light or heat, instead of a liquid adhesive agent, (JP 2015-166134 A) may have excellent initial adhesive strength, but has low stress such as elasticity and therefore does not endure further repeatedly applied deformation and vibration, in addition to deformation of tires caused by vehicle load, and is finally broken, which disadvantageously causes detachment or removal of a sound absorber.

When a butyl-based hot-melt adhesive agent is applied, the adhesive agent sufficiently elongates and offsets exterior shock even upon deformation of tires. However, as temperature increases, the viscosity of the hot-melt adhesive agent decreases, flowability increases, and the position of the sound absorber attached in a tire may be changed during driving, thus having a negative impact on balance or uniformity of the tire.

Some patents disclose use of silicone-based adhesive agents, but such adhesive agents are disadvantageously vulnerable to high deformation of tires due to low strength.

Therefore, there is a need for a specific adhesive agent which can endure tire deformation and heating in order to attach, to an inner liner, a sound absorber to solve the drawbacks of adhesive agents and reduce cavity sounds of tires.

PRIOR ART DOCUMENT

Japanese Patent Publication Laid-open No. 2015-166134

SUMMARY OF THE INVENTION

Therefore, the present invention has been made in view of the above problems, and it is one object of the present invention to provide a tire that can reduce cavity sound, which is tire noise generated by air vibration in the tire, by attaching a sound absorber layer with an adhesive agent layer with strong tenacity.

It is another object of the present invention to provide a tire that can prevent ozone aging by using an adhesive agent further including a UV absorber.

It is yet another object of the present invention to provide a tire that can maintain the performance of reducing cavity sound until the end of the abrasion lifespan of the tire without detachment or removal of a sound absorber even upon variation in temperature of the tire and deformation by vehicle load or exterior shock during driving, by attaching the sound absorber with an adhesive agent layer with strong tenacity.

In accordance with the present invention, the above and other objects can be accomplished by the provision of a tire with reduced cavity noise including an adhesive agent layer applied to an inside of an inner liner, and a sound absorber layer attached to the adhesive agent layer, wherein the adhesive agent layer includes polyether containing alkoxysilane at both ends thereof and a benzotriazole-based UV absorber.

The benzotriazole-based UV absorber may be any one selected from the group consisting of 2-(2'-hydroxy-5'-t-octylphenyl)benzotriazole, 2-(2'-hydroxy-5'-methylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-di-t-amylphenyl)-5-chlorobenzotriazole, 2-(2'-hydroxy-3',5'-t-butylphenyl)benzotriazole, 2-(2-hydroxy-4-octyloxyphenyl)-2H-benzotriazole, 2-(2-hydroxy-5-methylphenyl)-2H-benzotriazole, 5-chloro-2-(3,5-di-t-butyl-2-hydroxyphenyl)-2H-benzotriazole, 2-(3-t-butyl-2-hydroxy-5-methylphenyl)-5-chloro-2H-benzotriazole, 2-(3,5-di-t-pentyl-2-hydroxyphenyl)-2H-benzotriazole, 2-(3,5-di-t-butyl-2-hydroxyphenyl)-2H-benzotriazole, 2-(2-hydroxy-5-t-octylphenyl)-2H-benzotriazole, 2-[2'-hydroxy-3'-(3",4",5",6"-tetrahydrophthalimide-methyl)-5'-methylphenyl]benzotriazole, 2-(2'-hydroxy-3',5'-di-t-amylphenyl)benzotriazole, 2-(2-hydroxy-3-dodecyl-5-methylphenyl)benzotriazole, 2-[2-hydroxy-3,5-bi($\alpha,\alpha$-dimethylbenzyl)phenyl]-2H-benzotriazole, 2-(2H-benzotriazole-2-yl)-4-methyl-6-(3,4,5,6-tetrahydrophthalimidylmethyl)phenol and a condensate of methyl-3-[3-t-butyl-5-(2H-benzotriazol-2-yl)-4-hydroxyphenyl]propionate and polyethylene glycol.

The benzotriazole-based UV absorber may be present in an amount of 1 to 5 parts by weight, with respect to 100 parts by weight of the polyether containing the alkoxysilane at both ends thereof.

The adhesive agent layer may further include 50 to 70 parts by weight of a plasticizer, with respect to 100 parts by weight of the polyether containing the alkoxysilane at both ends thereof.

The plasticizer may include any one selected from the group consisting of di-iso-undecyl phthalate, di-ethylhexyl phthalate (DEHP), dihexyl phthalate (DHP), butyl benzyl phthalate (BBP), dipropyl phthalate (DprP), di-n-butyl phthalate (DBP), dicyclohexyl phthalate (DCHP), di-n-phenyl phthalate (DPP), diethyl phthalate (DEP), di-iso-nonyl phthalate (DINP), di-n-octyl phthalate (DNOP), di-iso-decyl phthalate (DIDP), dimethyl phthalate (DMP) and monoethylhexylphthalate (MEHP).

The polyether containing the alkoxysilane at both ends thereof may be represented by the following Formula 1:

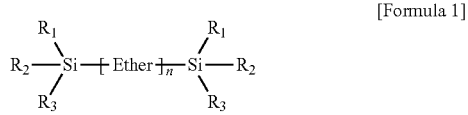

[Formula 1]

wherein $R_1$ to $R_3$ each independently represent a C1 to C3 alkyl or alkoxy group, and n is 10 to 1,000.

The ether repeat unit included in Formula 1 may be oxypropylene represented by the following Formula 2:

[Formula 2]

The ether repeat unit may be mono-alkoxysilane, di-alkoxysilane or tri-alkoxysilane, and the alkoxysilane may be any one selected from the group consisting of methoxysilane, ethoxysilane and propoxysilane.

The compound of Formula 1 may be represented by the following Formula 1a:

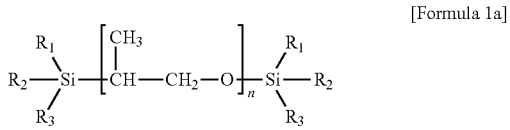

[Formula 1a]

The polyether containing the alkoxysilane at both ends thereof may further include a urethane repeat unit represented by the following Formula 3:

[Formula 3]

The sound absorber layer may include a polyurethane foam.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a side sectional view of a pneumatic tire according to an embodiment of the present invention.

DETAILED DESCRIPTION OF THE INVENTION

Hereinafter, the present invention will be described in more detail.

The tire with reduced cavity noise according to an embodiment of the present invention includes an adhesive agent layer applied to an inside of an inner liner and a sound absorber layer attached to the adhesive agent layer, wherein the adhesive agent layer includes polyether containing alkoxysilane at both ends thereof and a UV absorber.

The side sectional view of the pneumatic tire according to an embodiment of the present invention is shown in FIG. 1. Referring to FIG. 1, the pneumatic tire 1 according to the present invention includes an adhesive agent layer 2 applied to an inside surface of an inner liner and a sound absorber layer 3 attached to the adhesive agent layer 2.

The adhesive agent layer 2 includes polyether containing alkoxysilane at both ends thereof and a UV absorber.

In general, when an adhesive agent absorbs ultraviolet light, free radicals are produced. These radicals are subjected to processes such as photo-oxidation and proliferation in the material and then chain-terminate through recombination of free groups. For this reason, the adhesive agent causes problems such as cracks, blistering, and delaminating. These problems lead to deterioration in product lifespan. The UV absorber suppresses generation of polymer radicals due to high capability to absorb ultraviolet light, thus effectively solving the problems.

The UV absorber may include, in the molecule, a compound containing any one functional group selected from the group consisting of a primary amino group, a secondary amino group, a hydroxy group, a phenyl group, a carboxyl group and a mercapto group.

More specifically, the UV absorber is preferably a benzotriazole-based UV absorber containing, in the molecule, any one functional group selected from the group consisting of a primary amino group, a secondary amino group, a hydroxy group, a phenyl group, a carboxyl group and a mercapto group, most preferably, a benzotriazole-based UV absorber containing a hydroxy group and a phenyl group. The adhesive agent layer 2 including the benzotriazole-based UV absorber containing a hydroxy group and a phenyl group is characterized by maintaining physical properties of the adhesive agent even under ozone aging conditions.

Ozone cracking, which is a phenomenon wherein aging (cracking) is generated by ozone produced during driving of vehicles, may be generated in tires. Ozone is generated by reaction between exhaust gas from vehicles and sunlight (UV light). When the UV absorber included in the adhesive agent layer 2 according to the present invention absorbs UV light, the amount of ozone generated is decreased and as a result, aging by ozone is expected to be prevented.

In particular, the benzotriazole-based UV absorber containing a hydroxy group and a phenyl group exhibits excellent performance due to wide UV absorption wavelength range and high absorption degree.

Specifically, the benzotriazole-based UV absorber containing a hydroxy group and a phenyl group may be any one selected from the group consisting of 2-(2'-hydroxy-5'-t-octylphenyl)benzotriazole, 2-(2'-hydroxy-5'-methylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-di-t-amylphenyl)-5-chlorobenzotriazole, 2-(2'-hydroxy-3',5'-t-butylphenyl)benzotriazole, 2-(2-hydroxy-4-octyloxyphenyl)-2H-benzotriazole, 2-(2-hydroxy-5-methylphenyl)-2H-benzotriazole, 5-chloro-2-(3,5-di-t-butyl-2-hydroxyphenyl)-2H-benzotriazole, 2-(3-t-butyl-2-hydroxy-5-methylphenyl)-5-chloro-2H-benzotriazole, 2-(3,5-di-t-pentyl-2-hydroxyphenyl)-2H-benzotriazole, 2-(3,5-di-t-butyl-2-hydroxyphenyl)-2H-benzotriazole, 2-(2-hydroxy-5-t-octylphenyl)-2H-benzotriazole, 2-[2'-hydroxy-3'-(3",4",5",6"-tetrahydrophthalimide-methyl)-5'-methylphenyl]benzotriazole, 2-(2'-hydroxy-3',5'-di-t-amylphenyl)benzotriazole, 2-(2-hydroxy-3-dodecyl-5-methylphenyl)benzotriazole, 2-[2-hydroxy-3,5-bi(α,α-dimethylbenzyl)phenyl]-2H-benzotriazole, 2-(2H-benzotriazole-2-yl)-4-methyl-6-(3,4,5,6-tetrahydrophthalimidylmethyl)phenol and a condensate of methyl-3-[3-t-butyl-5-(2H-benzotriazol-2-yl)-4-hydroxyphenyl]propionate and polyethylene glycol.

The UV absorber may be present in an amount of 1 to 5 parts by weight, with respect to 100 parts by weight of polyether containing alkoxysilane at both ends thereof.

When the UV absorber is present in an amount of less than 1 part by weight, production of free groups resulting from UV absorption cannot be suppressed and problems such as cracking, blistering and delamination may occur, and when the UV absorber is present in an amount exceeding 5 parts by weight, problems such as deterioration of adhesivity of the adhesive agent layer 2 may occur.

In addition to the aforementioned ingredients, the adhesive agent layer 2 may further optionally include a single additive, such as a plasticizer, a dehydrating agent, an adhesion promoter or a curing promoter, commonly used to improve physical properties of the adhesive agent, or a mixture thereof.

As described above, when the adhesive agent layer 2 further includes a UV absorber, in the step of curing the adhesive agent layer at room temperature during the manufacture of tires, the adhesive agent layer 2 reacts with moisture ($H_2O$) in the air, inducing condensation or hydrolysis. As a result, the curing rate is disadvantageously very slow, and delayed curing of the adhesive agent layer delays the overall tire process, causing deterioration in productivity.

The adhesive agent layer 2 can solve the aforementioned problems by increasing the content of the plasticizer. The adhesive agent layer 2 including polyether containing alkoxysilane at both ends thereof and a benzotriazole-based UV absorber according to the present invention can solve problems of deteriorated curing rate and productivity because it can maintain physical properties in spite of increasing the content of the plasticizer.

The plasticizer may be present in an amount of 50 to 70 parts by weight, with respect to 100 parts by weight of the polyether containing alkoxysilane at both ends thereof.

When the plasticizer is present in an amount of less than 50 parts by weight, the filler cannot be suitably mixed in the step of mixing, problems associated with physical properties of the adhesive agent may occur due to deteriorated dispersibility and, when the plasticizer is present in an amount exceeding 70 parts by weight, strength is deteriorated due to the presence of a high amount of low molecular weight material, causing a problem associated with adhesivity.

The plasticizer may be an epoxy, polyester, benzoate, or citric acid plasticizer, is preferably a phthalate-based plasticizer, and is specifically selected from the group consisting of di-iso-undecyl phthalate, di-ethylhexyl phthalate (DEHP), dihexyl phthalate (DHP), butyl benzyl phthalate (BBP), dipropyl phthalate (DprP), di-n-butyl phthalate (DBP), dicyclohexyl phthalate (DCHP), di-n-phenyl phthalate (DPP), diethyl phthalate (DEP), di-iso-nonyl phthalate (DINP), di-n-octyl phthalate (DNOP), di-iso-decyl phthalate (DIDP), dimethyl phthalate (DMP) and monoethylhexylphthalate (MEHP).

The adhesion promoter may be aminosilane, and the aminosilane may be selected from the group consisting of n-2-aminoethyl-3-aminopropyltriethoxysilane, aminopropyltriethoxysilane, aminopropyltrimethoxysilane, bis(trimethoxysilylpropyl)amine, N-phenyl-aminopropyltrimethoxysilane, triamino-functional trimethoxysilane, aminopropylmethyldiethoxysilane, methacryloxypropyltrimethoxysilane, methylaminopropyltrimethoxysilane, glycidoxypropylethyldimethoxysilane, glycidoxypropyltrimethoxysilane, glycidoxyethyltrimethoxysilane, (3,4-epoxycyclohexyl)propyltrimethoxysilane, (3,4-epoxycyclohexyl)ethylmethyldimethoxysilane, isocyanatopropyltriethoxysilane, isocyanato propylmethyldimethoxysilane, cyanoethyltrimethoxysilane, acryloxypropyltrimethoxysilane, methacryloxypropylmethyldimethoxysilane, 4-amino-3,3,-dimethylbutyltrimethoxysilane, and n-ethyl-3-trimethoxysilyl-2-methylpropaneamine.

The adhesion promoter may be present in an amount of 5 to 7 parts by weight, with respect to 100 parts by weight of the polyether containing alkoxysilane at both ends thereof.

When the adhesion promoter is present in an amount of less than 5 parts by weight, problems associated with adhesion to an object to be attached (sound absorber layer 3) may occur, and when the adhesion promoter is present in an amount of more than 7 parts by weight, initial adhesion strength can be improved, but adhesive strength may be significantly reduced due to heat aging or the like.

The curing promoter may be a tin-containing compound and the tin-containing compound may be selected from the group consisting of dibutyltin dilaurate, dibutyltin diacetate, dibutyltin dimethoxide, tin octoate, isobutyltin triceroate, dibutyltin oxide, soluble dibutyltin oxide, dibutyltin bis-diisooctyl phthalate, bis-tripropoxysilyl dioctyltin, dibutyltin bis-acetyl acetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, tin butyrate, and diorganotin bis-diketonate.

The curing promoter exhibits excellent safety and superior catalytic activity and thermal stability, as compared to other metal-based curing promoters. The curing promoter is a catalyst mainly used for hardening of silicone-based adhesive agents at room-temperature and may be present in an amount of 1 to 3 parts by weight, with respect to 100 parts by weight of the polyether containing alkoxysilane at both ends thereof.

When the curing promoter is present in an amount of less than an amount of 1 part by weight, an object to be adhered may be detached during the process due to slow curing rate, and when the curing promoter is present in an amount exceeding 3 parts by weight, gelation is facilitated, which may cause problems associated with basic physical properties and adhesive strength.

The dehydrating agent may be selected from the group consisting of tetrapropyl orthosilicate, methyltrimethoxy silane, and vinyltrimethoxy silane.

The dehydrating agent has a molecular structure containing a bond which induces hydrolysis and substitution, thereby improving crosslinkage rate during crosslinkage and affecting an improvement in substitution capability by hydrolysis. In addition, the dehydrating agent affects the bonding strength of the adhesive agent layer 2 via silane coupling reaction.

The dehydrating agent may be present in an amount of 1 to 5 parts by weight, with respect to 100 parts by weight of the polyether containing alkoxysilane at both ends thereof.

When the dehydrating agent is present in an amount of less than 1 part by weight, silane coupling bonds are insufficient due to less dehydration reaction and bonding strength to silica is thus lowered, and when the dehydrating agent is present in an amount exceeding 5 parts by weight, the low-molecular weight material remains un-bonded, causing deterioration in physical properties.

The polyether containing alkoxysilane at both ends thereof contained in the adhesive agent layer 2 may be represented by the following Formula 1:

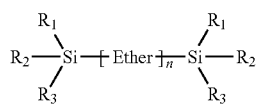

[Formula 1]

wherein $R_1$ to $R_3$ each independently represent a C1 to C3 alkyl or alkoxy group, and n is 10 to 1,000.

The ether repeat unit may be oxypropylene represented by the following Formula 2:

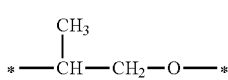

[Formula 2]

Since the polymer of Formula 1 contains an alkoxysilane group as a functional group at both ends thereof, crosslinkage is created between the polymers, thus improving adhesive strength.

The alkoxysilane may be mono-alkoxysilane, di-alkoxysilane, or tri-alkoxysilane.

The alkoxysilane may contain a C1 to C3 alkoxy group and is preferably selected from the group consisting of methoxysilane, ethoxysilane and propoxysilane, and is more specifically any one selected from the group consisting of methyldimethoxysilane, methyldiethoxysilane, methyldipropoxysilane, methyldibutoxysilane, ethyldimethoxysilane, ethyldiethoxysilane, ethyldipropoxysilane, ethyldibutoxysilane, propyldimethoxysilane, propyldiethoxysilane, propyldipropoxysilane, propyldibutoxysilane, butyldimethoxysilane, butyldiethoxysilane, butyldipropoxysilane, butyldibutoxysilane, dimethylmethoxysilane, dimethylethoxysilane, dimethylpropoxysilane, dimethylbutoxysilane, diethylmethoxysilane, diethylethoxysilane, diethylpropoxysilane, diethylbutoxysilane, dipropylmethoxysilane, dipropylethoxysilane, dipropylpropoxysilane, dipropylbutoxysilane, dibutylmethoxysilane, dibutylethoxysilane, dibutylpropoxysilane, dibutylbutoxysilane, methylethylmethoxysilane, methylpropylmethoxysilane, methylbutylmethoxysilane, methylethylethoxysilane, methylpropylethoxysilane, methylbutylethoxysilane, methylethylpropoxysilane, methylpropylpropoxysilane, methylbutylpropoxysilane, methylethylbutoxysilane, methylpropylbutoxysilane, methylbutylbutoxysilane, trimethoxysilane, triethoxysilane, and tripropoxysilane.

The polymer of Formula 1 may have a weight average molecular weight of 1,000 to 30,000 g/mol.

When the weight average molecular weight is less than 1,000 g/mol, elongation is decreased and tensile properties are thus deteriorated due to low weight average molecular weight, and when the weight average molecular weight exceeds 30,000 g/mol, crosslinkage density is decreased due to less bonding groups at both ends thereof, thus causing problems associated with tensile properties and bonding strength.

The compound of Formula 1 is more specifically represented by the following Formula 1a.

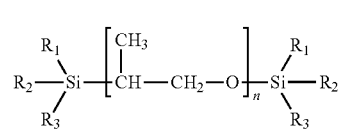

[Formula 1a]

wherein $R_1$ to $R_3$ each independently represent a C1 to C3 alkyl or alkoxy group, and n is 10 to 1,000.

The adhesive agent composition containing polyether containing alkoxysilane at both ends thereof can maintain the performance of reducing cavity sound until the end of the abrasion lifespan of tires without detachment, separation or removal of sound absorbers even upon variation by vehicle load or exterior shock or upon heating during driving.

The polyether containing alkoxysilane at both ends thereof may further include a urethane repeat unit represented by the following Formula 3:

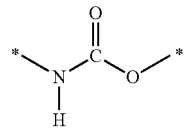

[Formula 3]

One or more of the urethane repeat unit and polyether may form a copolymer (random copolymer).

By further including the urethane repeat unit, it is possible to maintain a constant elasticity and improve strength to an extent to endure external force.

The sound absorber layer 3 preferably includes a polyurethane foam as a sound absorber.

The polyurethane foam is basically produced by urethane reaction of a polyisocyanate compound and a polyol (polyhydroxy) compound.

The polyurethane foam is a sound absorber which is based on polyurethane having open cells and may have a density of 25 to 35 kg/m³.

The open cell polyurethane foam is disadvantageously difficult to adhere to an inner liner because an adhesive agent having low viscosity is excessively absorbed in the polyurethane foam. However, since a silicone adhesive agent is absorbed only on the surface of open cells due to high viscosity and elasticity, it secures durability against high deformation without causing deterioration in adhesive strength, thus being suitable for adhesion of a polyurethane foam.

Hereinafter, embodiments of the present invention will be described in more detail such that a person having ordinary knowledge in the field to which the present invention pertains can easily implement the embodiments. However, the embodiments of the present invention can be implemented in various forms and should not be construed as being limited to the embodiments described herein.

Production Example: Preparation of Adhesive Agent Composition

An adhesive agent composition was prepared using the composition shown in the following Table 1.

TABLE 1

| Composition | | Comp. Ex. 1 | Ex. 1 | Ex. 2 | Ex. 3 | Ex. 4 | Comp. Ex. 2 |
|---|---|---|---|---|---|---|---|
| Basic polymer | Modified silicone polymer | 100 | 100 | 100 | 100 | 100 | 100 |
| Plasticizer | Diisoundecyl phthalate | 50 | 50 | 55 | 65 | 65 | 50 |
| Filler | Calcium carbonate | 120 | 120 | 120 | 120 | 120 | 120 |
| Dye | Titanium oxide | 20 | 20 | 20 | 20 | 20 | 20 |
| Thixotropy | Dried silica (fumed silica) | 5 | 5 | 5 | 5 | 5 | 5 |
| Dehydrator | Vinyl-trimethoxy silane | 2 | 2 | 2 | 2 | 2 | 2 |
| Adhesion promoter | Aminosilane | 3 | 5 | 5 | 5 | 7 | 3 |
| Curing promoter | Dibutyl tin | 1.5 | 1.5 | 1.5 | 1.5 | 1.5 | 1.5 |
| UV absorber 1 | Benzotriazole derivative | — | 1 | 1 | 1 | 1 | — |
| UV absorber 2 | | — | — | — | — | — | 1 |

(Unit: parts by weight)
1) Modified silicone polymer: polyoxypropylene methoxysilane
2) UV absorber 1: 2-(2'-hydroxy-5'-methylphenyl)benzotriazole

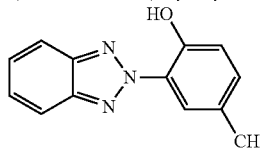

3) UV absorber 2: 2-ethylhexyl 2-cyano-3,3-diphenylacrylate

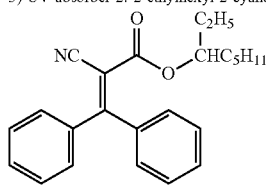

Test Example 1: Evaluation of Adhesive Strength

The adhesive agent prepared in Examples and Comparative Examples mentioned above were applied to tire inner liners to form adhesive agent layers and a sound absorber was adhered thereto to produce tires with reduced cavity noise. Physical properties of the adhesive agent layers were measured and are shown in Table 2.

TABLE 2

| Items | Items | Comp. Ex. 1 | Ex. 1 | Ex. 2 | Ex. 3 | Ex. 4 | Comp. Ex. 2 |
|---|---|---|---|---|---|---|---|
| Mechanical properties | Hardness (Shore A) | 28 | 29 | 28 | 27 | 30 | 29 |
| | Tensile strength (N/mm$^2$) | 1.1 | 1.3 | 1.1 | 0.9 | 1.5 | 1.3 |
| | Elongation (%) | 440 | 420 | 470 | 500 | 410 | 410 |
| Aging by ozone | Hardness (Shore A) | 32 | 30 | 30 | 28 | 28 | 30 |
| | Tensile strength (N/mm$^2$) | 0.9 | 1.3 | 1.1 | 0.8 | 0.9 | 1.2 |
| | Elongation (%) | 240 | 350 | 410 | 420 | 290 | 330 |
| General adhesive strength (N/25 mm) | | 159 | 161 | 188 | 163 | 163 | 163 |
| Ozone-aging adhesive strength (N/25 mm) | | 100 | 130 | 154 | 147 | 92 | 119 |

Mechanical properties and aging properties were measured in accordance with DIN53504, and adhesive strength was evaluated based on ASTM D1002.

Aging properties were measured after storing in an oven at 100° C. under aging conditions of an ozone atmosphere, at an ozone concentration of 50±5 ppm for 7 days.

The general adhesive strength was measured after hardening at room temperature (25° C.) for 7 days, and aging adhesive strength was measured after aging under the same aging conditions.

As can be seen from Table 2, Comparative Example 1 where a UV absorber is not included, hardness after ozone-aging was improved, which means that the adhesive agent is slightly hardened. As hardening proceeds, the adhesive gent layer loses elasticity, thus leading to a high possibility of detachment.

In the case where a UV absorber is used rather than a benzotriazole-based UV absorber (Comparative Example 2), mechanical properties, aging by ozone and adhesive strength were slightly improved as compared to Comparative Example 1, but were lower as compared to Comparative Examples 1 to 4.

It can be seen that Examples 1 to 4 where a UV absorber is included have no great variation in physical properties even after aging.

In particular, regarding physical properties, Example 2 shows suitable values of hardness and elongation and considerably excellent physical properties even after aging, which means that it is most effective to include the plasticizer in an amount of 55 to 65 parts by weight.

The tire according to the present invention can reduce cavity sound, which is tire noise generated by air vibration in the tire, by attaching a sound absorber layer including an adhesive agent layer with strong tenacity.

The tire can prevent ozone aging by using an adhesive agent further including a UV absorber.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tire with reduced cavity noise comprising:
an adhesive agent layer applied to an inside of an inner liner; and
a sound absorber layer attached to the adhesive agent layer,
wherein the adhesive agent layer comprises a polyether containing alkoxysilane at both ends thereof, 2-(2'-hydroxy-5'-methylphenyl)benzotriazole as a benzotriazole-based UV absorber presenting in an amount of 1 to 5 parts by weight, and a plasticizer presenting in an amount of 55 to 65 parts by weight, with respect to 100 parts by weight of the polyether containing alkoxysilane at both ends thereof, wherein the sound absorber layer comprises polyurethane foam which is based on polyurethane having open cells; and an adhesion promoter presenting in an amount of 5 parts by weight, with respect to 100 parts by weight of the polyether containing alkoxysilane at both ends thereof.

2. The tire according to claim 1, wherein the plasticizer is any one selected from the group consisting of di-iso-undecyl phthalate, di-ethylhexyl phthalate (DEHP), dihexyl phthalate (DHP), butyl benzyl phthalate (BBP), dipropyl phthalate (DprP), di-n-butyl phthalate (DBP), dicyclohexyl phthalate (DCHP), di-n-phenyl phthalate (DPP), diethyl phthalate (DEP), di-iso-nonyl phthalate (DINP), di-n-octyl phthalate (DNOP), di-iso-decyl phthalate (DIDP), dimethyl phthalate (DMP) and monoethylhexylphthalate (MEHP).

3. The tire according to claim 1, wherein the polyether containing the alkoxysilane at both ends thereof is represented by the following Formula 1:

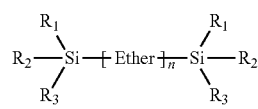

[Formula 1]

wherein $R_1$ to $R_3$ each independently represent a C1 to C3 alkyl or alkoxy group; and n is 10 to 1,000.

4. The tire according to claim 3, wherein the ether repeat unit included in Formula 1 is oxypropylene represented by the following Formula 2:

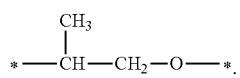

[Formula 2]

5. The tire according to claim 3, wherein the ether repeat unit is mono-alkoxysilane, di-alkoxysilane or tri-alkoxysilane, and the alkoxysilane is any one selected from the group consisting of methoxysilane, ethoxysilane and propoxysilane.

6. The tire according to claim 3, wherein the compound of Formula 1 is represented by the following Formula 1a:

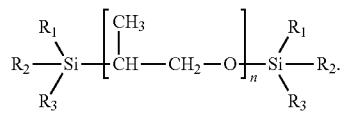

[Formula 1a]

7. The tire according to claim 3, wherein the polyether containing the alkoxysilane at both ends thereof further comprises a urethane repeat unit represented by the following Formula 3:

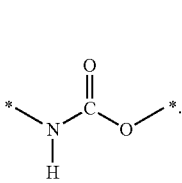

[Formula 3]

8. The tire according to claim 7, wherein the urethane repeat unit and the ether repeat unit form a copolymer.

9. The tire according to claim 8, wherein the copolymer is a random copolymer.

10. The tire according to claim 1, wherein the polyether containing the alkoxysilane at both ends thereof further comprises a urethane repeat unit forming a random copolymer with an ether repeat unit.

11. The tire according to claim 1, wherein the polyether containing the alkoxysilane at both ends thereof further comprises a urethane repeat unit forming a random copolymer with an ether repeat unit, and the urethane repeat unit is represented by the following Formula 3:

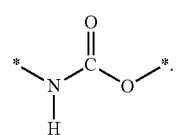

[Formula 3]

12. The tire according to claim 1, wherein the polyether containing the alkoxysilane at both ends thereof further comprises a urethane repeat unit forming a random copolymer with an ether repeat unit, and the urethane repeat unit is represented by the following Formula 3:

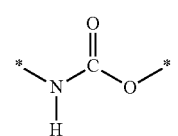

[Formula 3]

and wherein the ether repeat unit is oxypropylene represented by the following Formula 2:

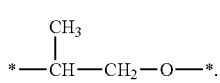

[Formula 2]

13. The tire according to claim 1, wherein the polyether containing the alkoxysilane at both ends thereof further comprises a urethane repeat unit and an ether repeat unit, the urethane repeat unit is represented by the following Formula 3:

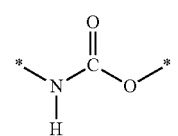

[Formula 3]

and the ether repeat unit is oxypropylene represented by the following Formula 2:

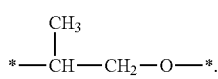

14. The tire according to claim 1, wherein the polyether containing the alkoxysilane at both ends thereof comprises polyoxypropylene methoxysilane.

15. A tire with reduced cavity noise comprising:
  an adhesive agent layer applied to an inside of an inner liner; and
  a sound absorber layer attached to the adhesive agent layer,
  wherein the adhesive agent layer comprises a polyether containing alkoxysilane at both ends thereof, 2-(2'-hydroxy-5'-methylphenyl)benzotriazole as a benzotriazole-based UV absorber presenting in an amount of 1 to 5 parts by weight, and a plasticizer presenting in an amount of 55 to 65 parts by weight, with respect to 100 parts by weight of the polyether containing alkoxysilane at both ends thereof,
  wherein the sound absorber layer comprises polyurethane foam which is based on polyurethane having open cells;
  an adhesion promoter presenting in an amount of 5 parts by weight, with respect to 100 parts by weight of the polyether containing alkoxysilane at both ends thereof;
  wherein the polyether containing the alkoxysilane at both ends thereof further comprises a urethane repeat unit forming a random copolymer with an ether repeat unit, and the urethane repeat unit is represented by the following Formula 3:

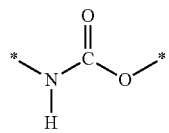

[Formula 3]

and wherein the ether repeat unit is oxypropylene represented by the following Formula 2:

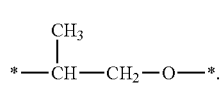

[Formula 2]

* * * * *